United States Patent
Sakaguchi et al.

(10) Patent No.: US 12,241,200 B2
(45) Date of Patent: Mar. 4, 2025

(54) SIZING AGENT COMPOSITION FOR FIBERS, FIBER BUNDLE, FIBER PRODUCT AND COMPOSITE MATERIAL

(71) Applicant: SANYO CHEMICAL INDUSTRIES, LTD., Kyoto (JP)

(72) Inventors: Sayaka Sakaguchi, Kyoto (JP); Takuya Hosogi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 403 days.

(21) Appl. No.: 17/263,405

(22) PCT Filed: Jul. 30, 2019

(86) PCT No.: PCT/JP2019/029825
§ 371 (c)(1),
(2) Date: Jan. 26, 2021

(87) PCT Pub. No.: WO2020/027126
PCT Pub. Date: Feb. 6, 2020

(65) Prior Publication Data
US 2021/0156079 A1  May 27, 2021

(30) Foreign Application Priority Data
Aug. 2, 2018 (JP) ................................. 2018-146068

(51) Int. Cl.
*D06M 15/55* (2006.01)
*D06M 15/27* (2006.01)
*D06M 15/507* (2006.01)

(52) U.S. Cl.
CPC ............ *D06M 15/55* (2013.01); *D06M 15/27* (2013.01); *D06M 15/507* (2013.01); *D06M 2200/40* (2013.01)

(58) Field of Classification Search
CPC .... D06M 15/55; D06M 15/27; D06M 15/263; D06M 15/273; D06M 15/507; D06M 2200/40; D06M 13/224; D06M 13/1845; C08J 5/06; C09D 163/00; C09D 129/00; C09D 177/00; C08L 63/00; C08L 33/00; B29B 15/14
See application file for complete search history.

(56) References Cited

U.S. PATENT DOCUMENTS

| | | | | |
|---|---|---|---|---|
| 4,956,425 | A | * | 9/1990 | Hefner, Jr. ......... C08G 59/1433 525/934 |
| 2014/0256855 | A1 | | 9/2014 | Wakabayashi et al. |
| 2014/0329075 | A1 | * | 11/2014 | Ichikawa ............... D06M 13/11 427/386 |
| 2015/0252160 | A1 | * | 9/2015 | Teranishi ............. C09D 163/00 524/502 |
| 2017/0284015 | A1 | * | 10/2017 | Sakaguchi ............... C08J 5/042 |
| 2018/0245246 | A1 | | 8/2018 | Sinmen et al. |

FOREIGN PATENT DOCUMENTS

| | | | | | |
|---|---|---|---|---|---|
| CN | 101886336 | | | 11/2010 | |
| CN | 103748281 | A | * | 4/2014 | ............. C08J 5/042 |
| CN | 109385899 | A | * | 2/2019 | ........ D06M 13/2246 |
| JP | 52-110997 | | | 9/1977 | |
| JP | 2-307979 | | | 12/1990 | |
| JP | 3-65311 | | | 3/1991 | |
| JP | 2001-348783 | | | 12/2001 | |
| JP | 2002-37904 | | | 2/2002 | |
| JP | 2004027043 | A | * | 1/2004 | |
| JP | 2013-249562 | | | 12/2013 | |
| JP | 2016-160549 | | | 9/2016 | |
| JP | 6495423 | B1 | * | 4/2019 | |
| KR | 10-2016-0055983 | | | 5/2016 | |
| KR | 20160055983 | A | * | 5/2016 | ............ D06M 14/36 |
| WO | 2013/027708 | | | 2/2013 | |
| WO | WO-2016043043 | A1 | * | 3/2016 | ............. C03C 25/24 |
| WO | 2017/078142 | | | 5/2017 | |
| WO | WO-2017078142 | A1 | * | 5/2017 | ................ C08J 5/24 |

OTHER PUBLICATIONS

Machine Translation of WO2016043043 (Year: 2016).*
Office Action issued Sep. 1, 2022 in corresponding Chinese Patent Application No. 201980049801.8, with English Translation.
Li Jinliang, "Synthesis of Acrylate-modified Aqueous Polyurethane and Its Application in Carbon Fiber Sizing Agent", Engineering Technology I, Chinese Master's Theses Full-text Database, pp. B016-B256, No. S2, Dec. 15, 2013.
International Search Report issued Oct. 21, 2019 in corresponding International (PCT) Application No. PCT/JP2019/029825.

* cited by examiner

*Primary Examiner* — Jennifer A Steele
(74) *Attorney, Agent, or Firm* — Wenderoth, Lind & Ponack, L.L.P.

(57) ABSTRACT

The present invention aims to provide a fiber sizing agent composition capable of providing high adhesion between fibers and a matrix resin, and also capable of forming fiber bundles with high sizing properties and reduced fluffing. A fiber sizing agent composition (C) of the present invention contains an epoxy resin (A) having an aromatic ring and not having a (meth)acryloyl group, and a (meth)acrylate (B).

15 Claims, No Drawings

SIZING AGENT COMPOSITION FOR FIBERS, FIBER BUNDLE, FIBER PRODUCT AND COMPOSITE MATERIAL

TECHNICAL FIELD

The present invention relates to a fiber sizing agent composition, a fiber bundle, a fiber product, and a composite material.

BACKGROUND ART

Composite materials of various kinds of fibers and various matrix resins are widely utilized in fields such as sports equipment, leisure equipment, and aircraft.

Examples of fibers used in these composite materials include glass fibers, carbon fibers, ceramic fibers, metal fibers, mineral fibers, rock fibers, and slag fibers. In order to prevent fluffing and/or end breakage, a sizing agent is usually applied to these fibers during processing into the composite materials.

However, fibers treated with a conventional sizing agent may have insufficient adhesion to a matrix resin when the matrix resin is a thermosetting resin or a thermoplastic resin, such as a vinyl ester resin or an unsaturated polyester resin, resulting in composite materials having insufficient physical properties.

Known countermeasures include use of a fiber sizing agent in which an epoxy resin is dispersed in an aqueous medium by a urethane resin having an alkoxy polyoxyethylene structure and an epoxy group (e.g., Patent Literature 1), and use of polyethyleneimine as a sizing agent (e.g., Patent Literature 2).

Improvement in physical properties of composite materials requires high adhesion between fibers and the matrix resin for effective utilization of fiber characteristics, and good sizing properties and reduced fluffing for easy handling of fiber bundles. Thus, there has been a demand for a sizing agent capable of increasing adhesion between fibers and the matrix resin, capable of enhancing the handling of fibers, and capable of forming fiber bundles with reduced fluffing.

The sizing agents suggested in Patent Literatures 1 and 2 are incapable of sufficiently improving the adhesion between fibers and the matrix resin, incapable of sufficiently improving sizing properties, and incapable of sufficiently suppressing fluffing of fiber bundles. When producing composite materials using the sizing agents suggested in Patent Literatures 1 and 2 with a highly viscous thermoplastic resin as a matrix resin, it is impossible to sufficiently improve the impregnation of fibers with the matrix resin, causing uneven impregnation and voids. As a result, the resulting composite materials have insufficient strength.

CITATION LIST

Patent Literature

Patent Literature 1: JP 2013-249562 A
Patent Literature 2: JP H03-065311 A

SUMMARY OF INVENTION

Technical Problem

The present invention aims to provide a fiber sizing agent composition capable of providing high adhesion between fibers and a matrix resin, and also capable of forming fiber bundles with high sizing properties and reduced fluffing.

Solution to Problem

As a result of studies to achieve the above aim, the present inventors arrived at the present invention.

Specifically, the present invention provides a fiber sizing agent composition (C) containing an epoxy resin (A) having an aromatic ring and not having a (meth)acryloyl group, and a (meth)acrylate (B); a fiber bundle containing at least one type of fibers selected from the group consisting of carbon fibers, glass fibers, aramid fibers, ceramic fibers, metal fibers, mineral fibers, and slag fibers, the fibers being treated with the fiber sizing agent composition (C); a fiber bundle containing at least one type of fibers selected from the group consisting of carbon fibers, glass fibers, aramid fibers, ceramic fibers, metal fibers, mineral fibers, and slag fibers, an epoxy resin (A) having an aromatic ring and not having a (meth)acryloyl group and/or a reaction product of the epoxy resin (A) having an aromatic ring and not having a (meth)acryloyl group, and a (meth)acrylate (B) and/or a reaction product of the (meth)acrylate (B); a fiber product including the fiber bundle; and a composite material containing the fiber bundle and/or the fiber product, and a matrix resin.

Advantageous Effects of Invention

The fiber sizing agent composition of the present invention can improve the adhesion between fibers and a matrix resin. Use of the fiber sizing agent composition (C) of the present invention achieves an effect of obtaining fiber bundles and fiber products with high sizing properties and reduced fluffing.

DESCRIPTION OF EMBODIMENTS

The fiber sizing agent composition (C) of the present invention contains an epoxy resin (A) having an aromatic ring and not having a (meth)acryloyl group, and a (meth)acrylate (B).

Herein, the term "(meth)acrylate" means acrylate and/or methacrylate, and the term "(meth)acryloyl" means acryloyl and/or methacryloyl.

In the fiber sizing agent composition (C) of the present invention, the epoxy resin (A) having an aromatic ring and not having a (meth)acryloyl group may have any chemical structure as long as it is an epoxy resin having an aromatic ring and an epoxy group and not having a (meth)acryloyl group in the molecule.

In the fiber sizing agent composition (C) of the present invention, examples of the epoxy resin (A) having an aromatic ring and not having a (meth)acryloyl group include a diepoxide (A1) having an aromatic ring and a novolac epoxy resin (A2).

Examples of the diepoxide (A1) having an aromatic ring include an aromatic ring-containing diglycidyl ether (A11), an aromatic ring-containing diglycidyl ester (A12), and an aromatic ring-containing diglycidyl amine (A13).

Examples of the aromatic ring-containing diglycidyl ether (A11) include diglycidyl ethers of dihydric phenols and diglycidyl ethers of aromatic ring-containing dihydric alcohols.

Examples of the diglycidyl ethers of dihydric phenols include condensates (including polycondensates) of C6-C30 dihydric phenols and epichlorohydrin, terminated with glycidyl ether at both ends.

Examples of the dihydric phenols include bisphenols (e.g., bisphenol F, bisphenol A, bisphenol B, bisphenol AD, bisphenol S, and halogenated bisphenol A), catechin, resorcinol, hydroquinone, 1,5-dihydroxynaphthalene, dihydroxybiphenyl, octachloro-4,4'-dihydroxybiphenyl, tetramethylbiphenyl, and 9,9'-bis(4-hydroxyphenyl)fluorene.

Examples of the diglycidyl ethers of aromatic ring-containing dihydric alcohols include C8-C30 aromatic aliphatic diols, adducts of alkylene oxide (hereinafter, "alkylene oxide" is sometimes abbreviated as "AO") with aromatic aliphatic diols, and condensates (including polycondensates) of adducts of AO with dihydric phenols and epichlorohydrin, terminated with glycidyl ether at both ends.

Examples of the C8-C30 aromatic aliphatic diols include 1,4-bis(2-hydroxyethyl)benzene, di[9-(3-hydroxypropyl)-9-fluorenyl]methane, and diphenylpropanediol.

Examples of the adducts of AO with aromatic aliphatic diols include adducts of AO (1 to 20 mol) with 1,4-bis(2-hydroxyethyl)benzene, adducts of AO (1 to 20 mol) with di[9-(3-hydroxypropyl)-9-fluorenyl]methane, and adducts of AO (1 to 20 mol) with diphenylpropanediol.

Examples of the adducts of AO with dihydric phenols include adducts of AO with bisphenols (e.g., bisphenol F, bisphenol A, bisphenol B, bisphenol AD, bisphenol S, and halogenated bisphenol A), catechin, resorcinol, hydroquinone, 1,5-dihydroxynaphthalene, dihydroxybiphenyl, octachloro-4,4'-dihydroxybiphenyl, tetramethylbiphenyl, and 9,9'-bis(4-hydroxyphenyl)fluorene.

Preferred of these are adducts of AO (1 to 20 mol) with bisphenol A.

Examples of the AO include ethylene oxide (hereinafter, "ethylene oxide" is sometimes abbreviated to "EO"), 1,2-propylene oxide (hereinafter, "1,2-propylene oxide" is sometimes abbreviated to "PO"), 1,2-butylene oxide (hereinafter, "1,2-butylene oxide" is sometimes abbreviated to "1,2-BO"), and 1,4-butylene oxide (hereinafter, "1,4-butylene oxide" is sometimes abbreviated to "1,4-BO").

In the aromatic ring-containing diglycidyl ether (A11), the molar ratio ((dihydric phenol units and/or dihydric alcohol units):(epichlorohydrin units)) of dihydric phenol units and/or dihydric alcohol units (those obtained by removing H from the hydroxy group (—OH) of the dihydric phenol and the dihydric alcohols) to epichlorohydrin units (total of glycidyl ether groups and groups (—CH(OH)CH$_2$—) obtained by ring-opening polymerization of epichlorohydrin) is represented by n:n+1. Herein, n is preferably 1 to 10, more preferably 1 to 8, particularly preferably 1 to 5. The diglycidyl ether (A11) may be a mixture in which n=1 to 10 (e.g., a mixture of components having different degrees of polycondensation).

Examples of the aromatic ring-containing diglycidyl ester (A12) include diglycidyl esters of aromatic dicarboxylic acids and diglycidyl esters of aromatic aliphatic dicarboxylic acids.

Examples of the diglycidyl esters of aromatic dicarboxylic acids include condensates (including polycondensates) of epichlorohydrin and aromatic dicarboxylic acids (e.g., terephthalic acid, isophthalic acid, phthalic acid, alkylisophthalic acids (e.g., 4-methylisophthalic acid), and naphthalenedicarboxylic acids (e.g., naphthalenedicarboxylic acid having two carboxy groups in different rings such as 1,5-naphthalenedicarboxylic acid, 1,6-naphthalenedicarboxylic acid, 1,7-naphthalenedicarboxylic acid, 1,8-naphthalenedicarboxylic acid, and 2,6-naphthalenedicarboxylic acid; and naphthalenedicarboxylic acids having two carboxy groups in the same ring such as 1,2-naphthalenedicarboxylic acid, 1,4-naphthalenedicarboxylic acid)), having two glycidyl groups.

Examples of the diglycidyl esters of aromatic aliphatic dicarboxylic acids include condensates (including polycondensates) of epichlorohydrin and aromatic aliphatic dicarboxylic acids (e.g., 1,4-phenylenediacetic acid), having two glycidyl groups.

In the aromatic ring-containing diglycidyl ester (A12), the molar ratio ((aromatic dicarboxylic acid units and/or aliphatic dicarboxylic acid units):(epichlorohydrin units)) of aromatic dicarboxylic acid units and/or aromatic aliphatic dicarboxylic acid units (those obtained by removing H from the carboxy group (—COOH) of the dicarboxylic acid) to epichlorohydrin units (total of glycidyl ether groups and groups (—CH(OH)CH$_2$—) obtained by ring-opening polymerization of epichlorohydrin) is represented by n:n+1. Herein, n is preferably 1 to 10, more preferably 1 to 8, particularly preferably 1 to 5. The diglycidyl ester (A12) may be a mixture in which n=1 to 10.

Examples of the aromatic ring-containing diglycidyl amine (A13) include N-glycidyl compounds (e.g., N,N-diglycidylaniline and N,N-diglycidyltoluidine). These compounds can be obtained by reaction of C6-C20 aromatic amine having 2 to 4 active hydrogen atoms (e.g., aniline and toluidine) with epichlorohydrin. These compounds can also be obtained by reaction of C7-C20 aromatic aliphatic amines having 2 to 4 active hydrogen atoms (e.g., 1,3- or 1,4-xylylenediamine) with epichlorohydrin.

In the aromatic ring-containing diglycidyl ester (A13), the molar ratio ((aromatic amine units):(epichlorohydrin units)) of aromatic amine units and/or aromatic aliphatic amine units (those obtained by removing two H from the amino group (—NH$_2$) of the aromatic amine and the aromatic aliphatic amine) to epichlorohydrin units (total of glycidyl ether units and epichlorohydrin ring-opening polymerization units) is represented by n:n+1. Herein, n is preferably 1 to 10, more preferably 1 to 8, particularly preferably 1 to 5. The diglycidyl amine (A13) may be a mixture in which n=1 to 10.

Preferred of these diepoxides (A1) are the diglycidyl ethers (A11), more preferred are diglycidyl ethers of dihydric phenols, particularly preferred are bisphenol diglycidyl ethers, and most preferred are bisphenol A diglycidyl ethers (bisphenol A epoxy resins), in order to increase the strength of a molded article of a composite material.

Examples of the novolac epoxy resin (A2) include ortho-cresol novolac epoxy resins, phenol novolac epoxy resins, and halogenated phenol novolac epoxy resins.

The novolac epoxy resin (A2) can be obtained by, for example, reaction of a novolac epoxy resin (e.g., an ortho-cresol novolac resin, a phenol novolac resin, or a halogenated phenol novolac resin) with epichlorohydrin in the presence of alkali. Commercial products are also available. Examples of commercially available ortho-cresol novolac epoxy resins include Sumiepoxy ESCN-195X and ESCN-220 available from Sumitomo Chemical Co., Ltd.; Araldite ECN-1273, ECN-1280, and ECN-1299 available from Ciba-Geigy Japan Limited; and EOCN-101, EOCN-102, and EOCN-103 available from Nippon Kayaku Co., Ltd. Examples of commercially available phenol novolac epoxy resins include Epikote 152 and Epikote 154 available from Yuka Shell Epoxy K.K., and YDPN-601 and YDPN-602 available from TOHTO Chemical Industry Co., Ltd. Examples of commercially available halogenated phenol novolac epoxy resins include BREN (brominated phenol novolac epoxy resin) available from Nippon Kayaku Co., Ltd.

When producing a composite material using the fiber sizing agent composition (C) of the present invention with a thermosetting resin as a matrix resin, in the fiber sizing agent composition (C) of the present invention, the epoxy equivalent (g/eq) of the epoxy resin (A) having an aromatic ring and not having a (meth)acryloyl group is preferably 100 to 1000, more preferably 100 to 800, in order to improve the adhesion between fibers and the matrix resin. Here, the term "epoxy equivalent" is a value measured in accordance with JIS K 7236.

When producing a composite material using the fiber sizing agent composition (C) of the present invention with a thermoplastic resin as a matrix resin, in the fiber sizing agent composition (C) of the present invention, the epoxy equivalent (g/eq) of the epoxy resin (A) having an aromatic ring and not having a (meth)acryloyl group is preferably 500 to 2000, more preferably 700 to 1500, in order to improve the adhesion between fibers and the matrix resin and to prevent voids.

In the fiber sizing agent composition (C) of the present invention, the (meth)acrylate (B) may have any chemical structure as long as it is a (meth)acrylate, and may include a (meth)acrylate (B1) not having an oxyalkylene group in the molecule and a (meth)acrylate (B2) having an oxyalkylene group in the molecule.

Preferably, the (meth)acrylate (B) does not have a glycidyl ether group in the molecule.

Preferably, the (meth)acrylate (B1) not having an oxyalkylene group in the molecule has two or more (meth) acryloyl groups in order to improve the adhesion between fibers and the matrix resin. Examples thereof include a bifunctional (meth)acrylate (B11), a trifunctional (meth) acrylate (B12), and a tetrafunctional or higher functional (meth)acrylate (B13).

Examples of the bifunctional (meth)acrylate (B11) include bifunctional non-aromatic (meth)acrylates and bifunctional aromatic (meth)acrylates.

Examples of the bifunctional non-aromatic (meth)acrylates include di-esterified products of C2-C20 dihydric or higher (preferably, di- to octahydric) alcohols and (meth) acrylic acid.

Examples of such compounds include 1,4-butanediol di(meth)acrylate, 1,6-hexanediol di(meth)acrylate, 1,10-decanediol di(meth)acrylate, and 2,4-dimethyl-1,5-pentanediol di(meth)acrylate.

Examples of the bifunctional aromatic (meth)acrylates include di-esterified products of diglycidyl ethers of dihydric phenols and (meth)acrylic acid.

Examples of such compounds include bisphenol (e.g., bisphenol F, bisphenol A, bisphenol B, bisphenol AD, bisphenol S, or halogenated bisphenol A) diglycidyl ether di(meth)acrylate, catechin diglycidyl ether di(meth)acrylate, resorcinol diglycidyl ether di(meth)acrylate, hydroquinone diglycidyl ether di(meth)acrylate, 1,5-dihydroxynaphthalene diglycidyl ether di(meth)acrylate, dihydroxybiphenyl diglycidyl ether di(meth)acrylate, octachloro-4,4'-dihydroxybiphenyl diglycidyl ether di(meth)acrylate, tetramethylbiphenyl diglycidyl ether di(meth)acrylate, and 9,9'-bis(4-hydroxyphenyl)fluorene diglycidyl ether di(meth)acrylate.

Examples of the trifunctional (meth)acrylate (B12) include trifunctional non-aromatic (meth)acrylates and trifunctional aromatic (meth)acrylates.

Examples of the trifunctional non-aromatic (meth)acrylates include tri-esterified products of C2-C20 trihydric or higher (preferably, tri- to octahydric) alcohols and (meth) acrylic acid.

Examples of such compounds include trimethylolethane tri(meth)acrylate, trimethylolpropane tri(meth)acrylate, pentaerythritol tri(meth)acrylate, dipentaerythritol tri(meth) acrylate, and sorbitol tri(meth)acrylate.

Examples of the trifunctional aromatic (meth)acrylates include tri-esterified products of trifunctional aromatic epoxy resins and (meth)acrylic acid.

Examples of such compounds include N,N,O-triglycidyl-p-aminophenol tri(meth)acrylate, N,N,O-triglycidyl-m-aminophenol tri(meth)acrylate, N,N,O-triglycidyl-4-amino-m-cresol tri(meth)acrylate, N,N,O-triglycidyl-5-amino-o-cresol tri(meth)acrylate, and 1,1,1-tris(4-hydroxyphenyl) ethane triglycidyl ether tri(meth)acrylate.

Examples of the tetrafunctional or higher functional (meth)acrylate (B13) include tetrafunctional or higher functional non-aromatic (meth)acrylates and tetrafunctional or higher functional aromatic (meth)acrylates.

Examples of the tetrafunctional or higher functional non-aromatic (meth)acrylates include tetra-esterified products, penta-esterified products, and hexa-esterified products of C2-C20 tetrahydric or higher (preferably, tetra- to octahydric) alcohols and (meth)acrylic acid.

Examples of such compounds include pentaerythritol tetra(meth)acrylate, sorbitol tetra(meth)acrylate, ditrimethylolpropane tetra(meth)acrylate, dipentaerythritol tetra(meth)acrylate, dipentaerythritol propionate tetra(meth)acrylate, sorbitol penta(meth)acrylate, dipentaerythritol penta (meth)acrylate, dipentaerythritol hexa(meth)acrylate, sorbitol hexa(meth)acrylate, and caprolactone-modified dipentaerythritol hexa(meth)acrylate.

Examples of the tetrafunctional or higher functional aromatic (meth)acrylates include tetra-esterified products of tetrafunctional or higher functional aromatic epoxy resins and (meth)acrylic acid.

Examples of such compounds include N,N,N',N'-tetraglycidylaminodiphenylmethane tetra(meth)acrylate, N,N,N',N'-tetraglycidyl 1,4-bis[2-(4-aminophenyl)-2-propyl]benzene tetra(meth)acrylate, 1,1,2,2-tetrakis [4-(glycidyloxy)phenyl] ethane tetra(meth)acrylate, polyester products from phenol novolac epoxy resins (polyfunctional epoxy resins) and (meth)acrylic acid, and polyester products from cresol novolac epoxy resins and (meth)acrylic acid.

Preferably, the (meth)acrylate (B2) having an oxyalkylene group in the molecule has two or more (meth)acryloyl groups in order to improve the adhesion between fibers and the matrix resin, and examples thereof include a bifunctional (meth)acrylate (B21), a trifunctional (meth)acrylate (B22), a tetra- to hexafunctional (meth)acrylate (B23), and a hepta- to decafunctional (meth)acrylate (B24).

Examples of the bifunctional (meth)acrylate (B21) include di-esterified products of adducts of AO with dihydric or higher (preferably, di- to octahydric) alcohols and (meth) acrylic acid; di-esterified products of adducts of AO with dihydric alcohols or dihydric phenols and (meth)acrylic acid; and epoxy acrylates that are reaction products of diglycidyl ethers of adducts of AO with dihydric alcohols or dihydric phenols and acrylic acid.

Examples of the di-esterified products of adducts of AO with dihydric or higher (preferably, di- to octahydric) alcohols and (meth)acrylic acid include di(meth)acrylates of adducts of AO with ethylene glycol, di(meth)acrylates of adducts of AO with 1,2- or 1,3-propanediol, di(meth)acrylates of adducts of AO with trimethylolpropane, and di(meth)acrylates of adducts of AO with glycerol.

Examples of the di-esterified products of adducts of AO with dihydric alcohols or dihydric phenols and (meth)acrylic acid include di(meth)acrylates of adducts of AO with bisphenol A.

Examples of the epoxy acrylates that are reaction products of diglycidyl ethers of adducts of AO with dihydric alcohols or dihydric phenols and acrylic acid include commercial products such as Epoxyester 40EM, Epoxyester 70PA, Epoxyester 200PA, Epoxyester 3002M, and Epoxyester 3002A (all available from Kyoeisha Chemical Co., Ltd.).

In the above compounds, not all hydroxy groups of polyhydric alcohols are required to undergo reaction with (meth)acrylic acid and/or AO, and some hydroxy groups may remain unreacted.

Examples of the AO include those having two to four carbon atoms, and specific examples thereof include EO, PO, 1,2-BO, and 1,4-BO.

The number of moles of AO added is preferably 2 to 100, more preferably 3 to 50, in view of the sizing properties and in order to improve the adhesion between fibers and the matrix resin.

Examples of the trifunctional (meth)acrylate (B22) include tri-esterified products of adducts of AO with trihydric or higher (preferably, tri- to octahydric) alcohols and (meth)acrylic acid. Examples of such compounds include tri(meth)acrylates of adducts of EO with trimethylolpropane.

Examples of the AO include those having two to four carbon atoms, and specific examples thereof include EO, PO, 1,2-BO, and 1,4-BO.

The number of moles of AO added is preferably 2 to 100, more preferably 3 to 50, in view of the sizing properties and in order to improve the adhesion between fibers and the matrix resin.

Examples of the tetra- to hexafunctional (meth)acrylate (B23) include tetra-esterified products, penta-esterified products, and hexa-esterified products of adducts of AO with tetrahydric or higher (preferably, tetra- to octahydric) alcohols and (meth)acrylic acid.

Examples of such compounds include tetra(meth)acrylates of adducts of EO with dipentaerythritol, penta(meth)acrylates of adducts of EO with dipentaerythritol, and penta (meth)acrylates of adducts of PO with dipentaerythritol.

Examples of the AO include those having two to four carbon atoms, and specific examples thereof include EO, PO, 1,2-BO, and 1,4-BO.

The number of moles of AO added is preferably 2 to 100, more preferably 3 to 50, in view of the sizing properties and in order to improve the adhesion between fibers and the matrix resin.

Examples of the hepta- to decafunctional (meth)acrylate (B24) include compounds that can be obtained by urethane reaction of an isocyanate compound having two or more isocyanate groups with one having a hydroxy group among the monofunctional (meth)acrylate (B21) to the trifunctional (meth)acrylate (B23) and if necessary a monofunctional (meth)acrylate having hydroxy groups (e.g., hydroxyethyl (meth)acrylate).

Examples of such compounds include compounds that can be obtained by reaction of penta(meth)acrylates of adducts of AO with dipentaerythritol with hexamethylene diisocyanate.

In the present invention, the number of (meth)acryloyl groups in one molecule of the (meth)acrylate (B) is preferably 2 or more, more preferably 2 to 4, particularly preferably 2, in order to improve the adhesion between fibers and the matrix resin.

In the present invention, when the matrix resin of a composite material is a thermosetting resin, the (meth)acrylic equivalent (g/eq) of the (meth)acrylate (B) is preferably 150 to 10000, more preferably 200 to 8000, in order to improve the adhesion between fibers and the matrix resin. Here, the term "(meth)acrylic equivalent" means a value obtained by dividing the molecular weight of the (meth)acrylate (B) by the number of (meth)acryloyl groups in one molecule.

In the present invention, when the matrix resin of a composite material is a thermoplastic resin, the (meth)acrylic equivalent (g/eq) of the (meth)acrylate (B) is preferably 150 to 1000, more preferably 200 to 800, in order to improve the adhesion between fibers and the matrix resin and to prevent voids.

In the present invention, preferably, the (meth)acrylate (B) contains a hydroxy group in view of the sizing properties and in order to improve the adhesion between fibers and the matrix resin. The number of hydroxy groups in the (meth)acrylate (B) is preferably 2 or more, more preferably 2 to 10, particularly preferably 2 to 5, in view of the sizing properties and in order to improve the adhesion between fibers and the matrix resin.

In the present invention, the hydroxy value (mgKOH/g) of the (meth)acrylate (B) is preferably 0 to 500, more preferably 0 to 100, in view of the sizing properties and in order to improve the adhesion between fibers and the matrix resin. Here, the term "hydroxy value" means a mass (mg) of potassium hydroxide equivalent to hydroxy groups contained in 1 g of a sample, measured according to JIS K 0070-1992.

When producing a composite material using the fiber sizing agent composition (C) of the present invention with a thermosetting resin as a matrix resin, the (meth)acrylate (B) is preferably the (meth)acrylate (B2) having an oxyalkylene group, more preferably an acrylate having an oxyalkylene group, particularly preferably a bifunctional acrylate having an oxyalkylene group, in order to improve the adhesion between fibers and the matrix resin and to reduce fluffing.

When producing a composite material using the fiber sizing agent composition (C) of the present invention with a thermoplastic resin as a matrix resin, the (meth)acrylate (B) is preferably the (meth)acrylate (B1) not having an oxyalkylene group, more preferably an aromatic (meth)acrylate not having an oxyalkylene group, particularly preferably an aromatic acrylate not having an oxyalkylene group, in order to improve the adhesion between fibers and the matrix resin and to prevent voids.

In the fiber sizing agent composition (C) of the present invention, the weight ratio (A)/(B) of the epoxy resin (A) having an aromatic ring and not having a (meth)acryloyl group to the (meth)acrylate (B) is preferably 10/90 to 90/10, more preferably 20/80 to 80/20, in view of the sizing properties and in order to improve the adhesion between fibers and the matrix resin. A weight ratio of 10/90 or more and 90/10 or less improves the adhesion between fibers and the matrix resin.

Preferably, the fiber sizing agent composition (C) of the present invention further contains a polyester resin (D) having a bisphenol skeleton and a polyoxyethylene chain.

In the present invention, the term "polyoxyethylene chain" means a compound in which two or more oxyethylene groups are continuously bonded.

The polyester resin (D) may have any chemical structure as long as it has a bisphenol skeleton and a polyoxyethylene chain. Yet, in view of the sizing properties and in order to reduce fluffing, the polyester resin (D) is preferably a polyester resin containing a dicarboxylic acid or its anhydride (d1) and a diol (d2), further preferably a polyester resin containing, as constituent monomers, the dicarboxylic acid or its anhydride (d1) and a diol (d22) having a bisphenol skeleton and a polyoxyethylene chain.

One polyester resin (D) may be used alone or two or more thereof may be used in combination.

Examples of the dicarboxylic acid or its anhydride (d1) constituting the polyester resin (D) include an aliphatic dicarboxylic acid (d11), an aromatic dicarboxylic acid (d12), and their acid anhydrides.

Examples of the aliphatic dicarboxylic acid (d11) include an acyclic saturated aliphatic dicarboxylic acid (d111), an acyclic unsaturated aliphatic dicarboxylic acid (d112), an alicyclic dicarboxylic acid (d113), and a dimer acid (d114).

Examples of the acyclic saturated aliphatic dicarboxylic acid (d111) include C2-C22 linear or branched acyclic saturated aliphatic dicarboxylic acids (e.g., oxalic acid, malonic acid, succinic acid, glutaric acid, methylsuccinic acid, ethylsuccinic acid, dimethylmalonic acid, α-methylglutaric acid, β-methylglutaric acid, 2,4-diethylglutaric acid, isopropylmalonic acid, adipic acid, pimelic acid, suberic acid, azelaic acid, sebacic acid, decanedicarboxylic acid, undecanedicarboxylic acid, dodecanedicarboxylic acid, tridecanedicarboxylic acid, tetradecanedicarboxylic acid, hexadecanedicarboxylic acid, octadecanedicarboxylic acid, icosandicarboxylic acid, decylsuccinic acid, dodecylsuccinic acid, and octadecylsuccinic acid).

Examples of the acyclic unsaturated aliphatic dicarboxylic acid (d112) include C4-C22 linear or branched acyclic unsaturated aliphatic dicarboxylic acids (e.g., maleic acid, fumaric acid, citraconic acid, mesaconic acid, dodecenylsuccinic acid, pentadecenylsuccinic acid, and octadecenylsuccinic acid).

Examples of the alicyclic dicarboxylic acid (d113) include C7-C14 alicyclic dicarboxylic acids (1,3- or 1,2-cyclopentanedicarboxylic acid, 1,2-, 1,3- or 1,4-cyclohexanedicarboxylic acid, 1,2-, 1,3- or 1,4-cyclohexanediacetic acid, and dicyclohexyl-4,4'-dicarboxylic acid).

Examples of the dimer acid (d114) include dimers of C8-C24 acyclic unsaturated aliphatic carboxylic acids (e.g., oleic acid, linoleic acid, and linolenic acid).

Examples of the aromatic dicarboxylic acid (d12) include C8-C14 aromatic dicarboxylic acids (e.g., terephthalic acid, isophthalic acid, phthalic acid, phenylmalonic acid, phenylsuccinic acid, β-phenylglutaric acid, α-phenyladipic acid, β-phenyladipic acid, biphenyl-2,2'- or 4,4'-dicarboxylic acid, naphthalenedicarboxylic acid, sodium 5-sulfoisophthalate, and potassium 5-sulfoisophthalate).

Examples of anhydrides of dicarboxylic acids include anhydrides of the aliphatic dicarboxylic acid (d11) and anhydrides of the aromatic dicarboxylic acid (d12), such as succinic anhydride, maleic anhydride, and phthalic anhydride.

One dicarboxylic acid or its anhydride (d1) may be used alone or two or more thereof may be used in combination.

In view of the sizing properties, preferred of these are the acyclic saturated aliphatic dicarboxylic acid (d111), the acyclic unsaturated aliphatic dicarboxylic acid (d112), and the aromatic dicarboxylic acid (d12); more preferred are oxalic acid, malonic acid, succinic acid, adipic acid, sebacic acid, maleic acid, fumaric acid, terephthalic acid, isophthalic acid, and phthalic acid; and particularly preferred are adipic acid, maleic acid, fumaric acid, terephthalic acid, and isophthalic acid.

The diol (d2) constituting the polyester resin (D) is preferably the diol (d22) having a bisphenol skeleton and a polyoxyethylene chain, in view of the sizing properties and in order to reduce fluffing.

In the diol (d22) having a bisphenol skeleton and a polyoxyethylene chain, examples of the bisphenol compound constituting the bisphenol skeleton include bisphenol A, bisphenol F, and bisphenol S.

In the diol (d22) having a bisphenol skeleton and a polyoxyethylene chain, the number of repeating units of the oxyethylene group constituting the polyoxyethylene chain is preferably 5 to 100, more preferably 5 to 80, in order to reduce fluffing.

The diol (d22) having a bisphenol skeleton and a polyoxyethylene chain may have a C2-C4 oxyalkylene group in addition to the polyoxyethylene chain. Examples of the oxyalkylene group include an oxyethylene group, an oxypropylene group, and an oxybutylene group.

Specific examples of the diol (d22) having a bisphenol skeleton and a polyoxyethylene chain include adducts of C2-C4 AO with the bisphenol compounds.

One diol (d2) may be used alone or two or more thereof may be used in combination.

In view of the sizing properties, preferred among the diols (d2) are adducts of AO with bisphenol A, adducts of AO with bisphenol F, and adducts of AO with bisphenol S, and more preferred are adducts of AO with bisphenol A and adducts of AO with bisphenol F.

The viscosity of the polyester resin (D) at 100° C. is preferably 0.5 to 50 Pa·s, more preferably 1 to 30 Pa·s, particularly preferably 3 to 20 Pa·s.

A viscosity in the range of 0.5 to 50 Pa·s results in better sizing properties and higher emulsification stability. Herein, the viscosity of the polyester resin (D) at 100° C. is measured using a Brookfield Viscometer (BL type) in accordance with JIS K 7117-1:1999 (corresponding to ISO 2555:1990).

Preferably, the polyester resin (D) has a number average molecular weight (hereinafter abbreviated to "Mn") of 1,000 to 50,000. An Mn of 1,000 or more results in sufficient sizing properties. An Mm or 50,000 or less results in high affinity to water and excellent emulsification stability.

The Mn is measured by GPC. The Mn is more preferably 1,500 to 30,000, particularly preferably 2,000 to 20,000. An Mn in these ranges results in better sizing properties and higher affinity to water.

GPC conditions for measurement of the Mn of the polyester resin (D) are as followed, for example.
Model: Alliance (liquid chromatograph available from Waters Corporation, Japan)
Column: Guardcolumn Super H-L
 +TSK gel Super H4000
 +TSK gel Super H3000
 +TSK gel Super H2000
 (all available from Tosoh Corporation)
Column temperature: 40° C.
Detector: RI (Refractive Index)
Eluent: tetrahydrofuran
Eluent flow rate: 0.6 ml/min
Sample concentration: 0.25 wt %
Amount to be injected: 10 μl Reference substance: polystyrene (TSK Standard Polystyrene available from Tosoh Corporation)

Examples of the method of producing the polyester resin (D) include a method in which the dicarboxylic acid or its anhydride (d1) and the diol (d2) are mixed in a predetermined molar ratio and stirred at a reaction temperature of 100° C. to 250° C. and at a pressure of −0.1 to 1.2 MPa to distill off water.

The molar ratio [the dicarboxylic acid or its anhydride (d1)/the diol (d2)] of the dicarboxylic acid or its anhydride (d1) to the diol (d2) is preferably 0.7 to 1.5, more preferably 0.8 to 1.25, with the Mn in the above ranges, in view of the sizing properties.

Preferably, the production of the polyester resin (D) includes adding a catalyst in an amount of 0.05 to 0.5 wt % based on the weight of polyester. Examples of the catalyst include para-toluenesulfonic acid, dibutyltin oxide, tetraisopropoxy titanate, and potassium oxalate titanate. In view of the reactivity and the environmental impact, tetraisopropoxy titanate and potassium oxalate titanate are preferred, and potassium oxalate titanate is more preferred.

The fiber sizing agent composition (C) of the present invention may contain, for example, a surfactant (E) and other additives, in addition to the epoxy resin (A), the (meth)acrylate (B), and the polyester resin (D).

The surfactant (E) may be added in order to emulsify a mixture of the epoxy resin (A) and the (meth)acrylate (B).

The surfactant (E) may be a nonionic surfactant, an anionic surfactant, a cationic surfactant, or an amphoteric surfactant, for example. One surfactant (E) may be used alone or two or more thereof may be used in combination.

The surfactant (E) is more preferably an anionic surfactant, a nonionic surfactant, or a combination of these, in order to easily produce an aqueous emulsion.

More preferred are adducts of alkylene oxide with alkyl (preferably, C9-C15 alkyl group) phenols, adducts of alkylene oxide with arylalkyl (preferably, C2-C10 alkyl group) phenols (e.g., styrenated phenol, styrenated cumylphenol, and styrenated cresol), pluronic surfactants, sulfate ester salts of adducts of alkylene oxide with the alkylphenols, sulfate ester salts of adducts of alkylene oxide with the arylalkylphenols, urethane joint products of the pluronic surfactants, urethane joint products of adducts of alkylene oxide with the arylalkylphenols and polyethyleneglycols, and mixtures of these; and particularly preferred are adducts of alkylene oxide with the arylalkylphenols, sulfate ester salts of adducts of alkylene oxide with the arylalkylphenols, and mixtures of these.

Examples of the other additives include smoothing agents, preservatives, and antioxidants.

Examples of the smoothing agents include waxes (e.g., polyethylene, polypropylene, oxidized polyethylene, oxidized polypropylene, modified polyethylene, and modified polypropylene), higher fatty acid (C6-C30 fatty acid) alkyl (C1-C24 alkyl) esters (e.g., methyl stearate, ethyl stearate, propyl stearate, butyl stearate, octyl stearate, and stearyl stearate), higher fatty acids (C6-C30 fatty acids) (e.g., myristic acid, palmitic acid, and stearic acid), natural fats and oils (e.g., coconut oil, beef tallow, olive oil, and rapeseed oil), and liquid paraffin.

Examples of the preservatives include benzoic acids, salicylic acids, sorbic acids, quaternary ammonium salts, and imidazoles.

Examples of the antioxidants include phenols (e.g., 2,6-di-t-butyl-p-cresol), thiodipropionates (e.g., dilauryl 3,3'-thiodipropionate), and phosphites (e.g., triphenylphosphite).

Preferred amounts of the epoxy resin (A), the (meth)acrylate (B), the polyester resin (D), the surfactant (E), and the other additives in the fiber sizing agent composition (C) of the present invention are as follows.

The weight percentage of the epoxy resin (A) is preferably 1 to 90 wt %, more preferably 5 to 80 wt %, particularly preferably 10 to 75 wt %, based on the weight of solids of the fiber sizing agent composition (C), in order to improve the adhesion between fibers and the matrix resin.

The weight percentage of the (meth)acrylate (B) is preferably 1 to 90 wt %, more preferably 5 to 80 wt %, particularly preferably 10 to 75 wt %, based on the weight of solids of the fiber sizing agent composition (C), in order to improve the adhesion between fibers and the matrix resin.

The weight percentage of the polyester resin (D) is preferably 5 to 90 wt %, more preferably 10 to 70 wt %, based on the weight of solids of the fiber sizing agent composition (C), in view of the sizing properties.

The weight percentage of the surfactant (E) is preferably 0.1 to 40 wt %, more preferably 0.5 to 35 wt %, particularly preferably 1 to 30 wt %, based on the weight of solids of the fiber sizing agent composition (C), in view of the emulsification stability.

The weight percentage of the other additives such as the smoothing agent, the preservative, and the antioxidant is preferably 0.01 to 20 wt %, more preferably 0.05 to 15 wt %, particularly preferably 0.1 to 10 wt %, based on the weight of solids of the fiber sizing agent composition (C), in view of the fluidity and the stability over time.

Preferably, the fiber sizing agent composition (C) of the present invention contains an aqueous medium so that it can be provided in the form of an aqueous solution or aqueous emulsion.

The presence of the aqueous medium makes it easy to suitably adjust the amount of solids of the fiber sizing agent composition (C) to be attached to fibers. Thus, the resulting fiber bundle can further increase the strength of a molded article of a composite material.

The aqueous medium can be a known aqueous medium, for example. Specific examples thereof include water and hydrophilic organic solvents (C1-C4 monovalent alcohols (e.g., methanol, ethanol, and isopropanol), C3-C6 ketones (e.g., acetone, ethyl methyl ketone, and methyl isobutyl ketone), C2-C6 glycols (ethylene glycol, propylene glycol, diethylene glycol, and triethylene glycol) and monoalkyl (C1-C2) ethers of these, dimethylformamide, and C3-C5 alkyl acetates (e.g., methyl acetate and ethyl acetate)).

Two or more of these may be used in combination. Preferred of these are water and mixtures of water and one or more of the hydrophilic organic solvents, and more preferred is water, in view of the safety and the like.

In view of the cost and the like, preferably, the fiber sizing agent composition (C) of the present invention is of high concentration during distribution and is of low concentration during production of fiber bundles. Specifically, high concentrations during distribution make it possible to reduce the transport cost, storage cost, and the like, while low concentrations for fiber treatment makes it possible to produce fiber bundles capable of increasing the strength of a molded article of a composite material.

The concentration of an aqueous solution or emulsion of high concentration (weight percentage of solids relative to the fiber sizing agent composition (C)) is preferably 20 to 80 wt %, more preferably 30 to 70 wt %, in view of the storage stability and the like.

The concentration of an aqueous solution or emulsion of low concentration (weight percentage of solids relative to the fiber sizing agent composition (C)) is preferably 0.5 to 15 wt %, more preferably 1 to 10 wt %, in order to suitably adjust the amount of the fiber sizing agent during production of fiber bundles, for example.

The fiber sizing agent composition (C) of the present invention can be produced by mixing the followings at any order: the epoxy resin (A) having an aromatic ring and not having a (meth)acryloyl group; the (meth)acrylate (B); and optional components such as an aqueous medium, the polyester resin (D), the surfactant (E), and other additives. When an aqueous medium is to be added, a preferred method is one in which the components other than the aqueous medium are pre-mixed, and the resulting mixture is mixed with the aqueous medium to dissolve or emulsify and disperse the mixture in the aqueous medium.

The temperature during pre-mixing of the components other than the aqueous medium is preferably 20° C. to 90° C., more preferably 40° C. to 90° C., in order to facilitate mixing. The same temperature ranges apply to subsequent dissolution or emulsification and dispersion.

The duration for dissolution or emulsification and dispersion is preferably 1 to 20 hours, more preferably 2 to 10 hours.

Any mixer, dissolver, and emulsifier disperser can be used. Examples thereof include stirring blades (blade shape: ore, three blade paddle, or the like), Nauta mixers, ribbon mixers, conical blenders, mortar mixers, universal mixers (e.g., a universal mixer and stirrer "5DM-L" available from San-ei Manufacturing Co., Ltd.), and Henschel mixers.

Examples of fibers to which the fiber sizing agent composition (C) of the present invention is applicable include known fibers (e.g., those described in WO 2003/47830) such as glass fibers, carbon fibers, aramid fibers, ceramic fibers, metal fibers, mineral fibers, rock fibers, and slag fibers. Preferred is at least one type of fibers selected from the group consisting of carbon fibers, glass fibers, aramid fibers, ceramic fibers, metal fibers, mineral fibers, and slag fibers, and more preferred are carbon fibers, in order to increase the strength of a molded article of a composite material. Two or more types of these fibers may be used in combination.

The fiber bundle (a fiber bundle of about 3000 to 50000 fibers) of the present invention includes at least one type of fibers selected from the group consisting of carbon fibers, glass fibers, aramid fibers, ceramic fibers, metal fibers, mineral fibers, and slag fibers, the fibers being treated with the fiber sizing agent composition (C) of the present invention.

Specifically, the fiber bundle of the present invention contains at least one type of fibers selected from the group consisting of carbon fibers, glass fibers, aramid fibers, ceramic fibers, metal fibers, mineral fibers, and slag fibers, the epoxy resin (A) having an aromatic ring and not having a (meth)acryloyl group and/or a reaction product of the epoxy resin (A), and the (meth)acrylate (B) and/or a reaction product of the (meth)acrylate (B).

Examples of the reaction product of the epoxy resin (A) include those obtained from reaction between the epoxy resins (A) and those obtained from reaction of the epoxy resin (A) with carbon fibers (e.g., carboxy groups and hydroxy groups in carbon fibers).

Examples of the reaction product of the (meth)acrylate (B) include those obtained by reaction between the (meth)acrylates (B).

Examples of the method of treating fibers include spraying and immersion. The amount (wt %) of solids of the fiber sizing agent composition (C) to be attached to fibers is preferably 0.05 to 5 wt %, more preferably 0.2 to 2.5 wt %, based on the weight of the fibers. The fiber sizing agent composition (C) in the above ranges can further increase the strength of a molded article of a composite material.

The weight ratio ((A) and reaction product of (A)/(B) and reaction product of (B)) of the epoxy resin (A) having an aromatic ring and not having a (meth)acryloyl group and the reaction production of the epoxy resin (A) to the (meth)acrylate (B) and the reaction product of the (meth)acrylate (B) in the fiber bundle is preferably 10/90 to 90/10, more preferably 20/80 to 80/20, in view of the sizing properties and in order to improve the adhesion between fibers and the matrix resin.

In order to improve the adhesion between the fibers and the matrix resin, the weight percentage of the epoxy resin (A) having an aromatic ring and not having a (meth)acryloyl group and the reaction product of the epoxy resin (A) in the fiber bundle is preferably 0.0005 to 4.5 wt %, more preferably 0.002 to 4 wt %, still more preferably 0.0025 to 3.75 wt %, yet still more preferably 0.005 to 2.25 wt %, further still preferably 0.01 to 2 wt %, particularly preferably 0.02 to 1.875 wt %, based on the weight of the fibers.

In order to improve the adhesion between the fibers and the matrix resin, the weight percentage of the (meth)acrylate (B) and the reaction product of the (meth)acrylate (B) in the fiber bundle is preferably 0.0005 to 4.5 wt %, more preferably 0.002 to 4 wt %, still more preferably 0.0025 to 3.75 wt %, yet still more preferably 0.005 to 2.25 wt %, further still preferably 0.01 to 2 wt %, particularly preferably 0.02 to 1.875 wt %, based on the weight of the fibers.

In view of the sizing properties, the weight percentage of the polyester resin (D) in the fiber bundle is preferably 0.0025 to 4.5 wt %, more preferably 0.005 to 3.5 wt %, still more preferably 0.01 to 2.25 wt %, particularly preferably 0.02 to 1.75 wt %, based on the weight of the fibers.

In order to improve the adhesion between the fibers and the matrix resin, the weight percentage of the surfactant (E) in the fiber bundle is preferably 0.00005 to 2 wt %, more preferably 0.0002 to 1.75 wt %, still more preferably 0.00025 to 1.5 wt %, yet still more preferably 0.0005 to 1 wt %, further still more preferably 0.001 to 0.875 wt %, particularly preferably 0.002 to 0.75 wt %, based on the weight of the fibers.

The fiber product of the present invention is made of the fiber bundle. Examples thereof include fiber products obtained by processing the fiber bundle, such as woven fabrics, knitted fabrics, nonwoven fabrics (e.g., felt, mats, and paper), chopped fibers, and milled fibers.

The composite material of the present invention contains the fiber bundle and/or fiber product of the present invention, and a matrix resin. The matrix resin may be a thermoplastic resin or a thermosetting resin.

Examples of the thermoplastic resin include polyethylene, polypropylene, polyethylene terephthalate, polybutylene terephthalate, polyamide, polystyrene, polyethersulfone, acrylonitrile-styrene resins, acrylonitrile-butadiene-styrene resins, acrylic resins, polycarbonate, polyetherimide, polyetheretherketone, polyacetal, polyphenylene oxide, and polyphenylene sulfide.

Examples of the thermosetting resin include epoxy resins, unsaturated polyester resins, and vinyl ester resins. When the matrix resin is a thermosetting resin, the composite material may contain a catalyst. Any known catalyst can be used without limitations. For example, when the thermosetting resin is an epoxy resin, one described in JP 2005-213337 A may be used.

The weight ratio (matrix resin/fiber bundle and fiber product) of the matrix resin to the fiber bundle and fiber product is preferably 10/90 to 90/10, more preferably 20/80 to 70/30, particularly preferably 30/70 to 60/40, in view of the strength of a composite material to be molded.

When the catalyst is contained, the catalyst content relative to the matrix resin is preferably 0.01 to 10 wt %, more preferably 0.1 to 5 wt %, particularly preferably 1 to 3.

When the matrix resin is a thermoplastic resin, the composite material of the present invention can be produced by, for example, a method that includes impregnating the fiber product of the present invention (e.g., woven fabrics, knitted fabrics, or nonwoven fabrics) with a thermally melted (preferred melting temperature: 60° C. to 150° C.) matrix resin or a matrix resin diluted with a solvent (e.g., acetone, methyl ethyl ketone, methyl isobutyl ketone, toluene, xylene, or ethyl acetate), or a method that includes introducing the fiber bundle of the present invention or chopped fibers obtained by cutting the fiber bundle of the present invention into the thermoplastic matrix resin, kneading and mixing to obtain a mixture, and injection-molding the mixture.

When the matrix resin is a thermosetting resin, the composite material can be produced by heat-molding a mixture of the components and solidifying at room temperature. Although the composite material is not required to be completely cured, preferably, it is cured to an extent that allows the molded composite material to maintain its shape. The molded composite material may be further heated to be completely cured.

EXAMPLES

Hereinafter, the present invention is described in further detail with reference to Examples and Comparative Examples, but the present invention is not limited thereto. Hereinafter, "%" means "wt %", and "part(s)" means part(s) by weight, unless otherwise specified.

Production Example 1<Production of Polyether Polyol (b7-1)>

An autoclave was charged with 1,2-propanediol (100 parts) and a 50% aqueous solution of potassium hydroxide available from Toagosei Co., Ltd. (3 parts). After purging with nitrogen, the water content was adjusted to 0.1% or less by vacuum dehydration at 120° C. for 60 minutes. Then, PO (865 parts) and EO (865 parts) were simultaneously pressed in at 105° C. to 130° C. over about 3 hours, and the reaction was continued at the same temperature until the volatile content was 0.1% or less. Further, the water content was adjusted to 0.05% or less by vacuum dehydration at 120° C. for 60 minutes.

The resulting reaction product was mixed with water and an alkaline adsorbent (KYOWAAD 600 available from Kyowa Chemical Industry Co., Ltd.), followed by filtration and thermal dehydration, whereby a polyether polyol (b7-1) was obtained. The Mn of the polyether polyol (b7-1) was 1400.

Production Example 2<Production of Polyether Polyol Diglycidyl Ether (b7-2)>

A reaction vessel equipped with a thermometer, a stirrer, and a nitrogen gas inlet tube was charged with the polyether polyol (b7-1) produced in Production Example 1 (1540 parts), epichlorohydrin (420 parts), and sodium hydroxide (182 parts). These components were reacted at 50° C. for 5 hours under vigorous stirring in a nitrogen atmosphere. After the reaction, water (730 parts) was added to wash the reaction product by stirring for 10 minutes.

After standing, the upper layer was separated. After filtration, excess epichlorohydrin was vacuum removed from the filtrate, whereby a polyether polyol diglycidyl ether (b7-2) (1600 parts) was obtained as a residue. The epoxy equivalent of the glycidyl ether was 890 g/eq.

Production Example 3<Production of Epoxy Diacrylate (B-7)>

A glass reaction vessel equipped with a heating/cooling stirrer, a reflux cooling tube, a dropping funnel, and a thermometer was charged with the polyether polyol diglycidyl ether (b7-2) produced in Production Example 2 (320 parts) and toluene (99.7 parts), followed by heating to 110° C. for uniform dissolution.

Subsequently, acrylic acid (25.8 parts), triphenylphosphine (0.3 parts), and p-methoxyphenol (0.03 parts) were added and reacted at 110° C. for 10 hours.

The completion of esterification was determined by the acid value. When the acid value was confirmed to be 1.0 mgKOH/g or less, the reaction product was cooled to 60° C. Further, a gas mixture of nitrogen and oxygen in which the oxygen concentration was adjusted to 8 vol % was passed through the solution in order to prevent polymerization. The temperature was raised to 80° C. and toluene was distilled off at reduced pressure, whereby an epoxy diacrylate (B-7) having a hydroxy group in the molecule was obtained.

Production Example 4<Production of Polyether Polyol Diacrylate (B-12)>

A glass reaction vessel equipped with a heating/cooling stirrer, a reflux cooling tube, a dropping funnel, and a thermometer was charged with an adduct (number average molecular weight: 3500) of EO with polypropylene glycol (number average molecular weight: 2000) "NEWPOL PE-75" (350 parts) and toluene (400 parts), followed by heating to 110° C. for uniform dissolution.

Subsequently, acrylic acid (14.5 parts), triphenylphosphine (0.3 parts), and p-methoxyphenol (0.03 parts) were added and reacted at 110° C. for 10 hours.

The completion of esterification was determined by the acid value. When the acid value was confirmed to be 1.0 mgKOH/g or less, the reaction product was cooled to 80° C. Further, a gas mixture of nitrogen and oxygen in which the oxygen concentration was adjusted to 8 vol % was passed through the solution in order to prevent polymerization, and toluene was distilled off at reduced pressure, whereby an epoxy diacrylate (B-12) was obtained.

Production Example 5<Production of Polyether Polyol Diacrylate (B-13)>

Production Example 4 was repeated except that "NEWPOL PE-75" (350 parts) was changed to "NEWPOL PE-68" (800 parts), i.e., an adduct (number average molecular weight: 8000) of EO with polypropylene glycol (number average molecular weight: 1750), whereby an epoxy diacrylate (B-13) was obtained.

Production Example 6<Production of Polyether Polyol Diacrylate (B-14)>

Production Example 4 was repeated except that "NEWPOL PE-75" (350 parts) was changed to "NEWPOL PE-108" (1600 parts), i.e., an adduct (number average molecular weight: 16000) of EO with polypropylene glycol (number average molecular weight: 3250), whereby an epoxy diacrylate (B-14) was obtained.

Production Example 7<Production of Polyether Polyol Diglycidyl Ether (b15-1)>

Production Example 2 was repeated except that the polyether polyol (b7-1) (1540 parts) was changed to "NEWPOL PE-75" (3500 parts), i.e., an adduct (number average molecular weight: 3500) of EO with polypropylene glycol (number average molecular weight: 2000), whereby a polyether polyol diglycidyl ether (b15-1) was obtained. The epoxy equivalent of the glycidyl ether was 1800 g/eq.

Production Example 8<Production of Epoxy Diacrylate (B-15)>

Production Example 3 was repeated except that the polyether polyol diglycidyl ether (b7-2) (320 parts) was changed to the polyether polyol diglycidyl ether (b15-1) (1800 parts), that the amount of toluene was changed from 99.7 parts to 600 parts, and that the amount of acrylic acid was changed from 25.8 parts to 72 parts, whereby an epoxy diacrylate (B-15) having a hydroxy group in the molecule was obtained.

Production Example 9<Production of Polyether Polyol Diglycidyl Ether (b16-1)>

Production Example 2 was repeated except that the polyether polyol (b7-1) (1540 parts) was changed to "NEWPOL PE-68" (4000 parts), i.e., an adduct (number average molecular weight: 8000) of EO with polypropylene glycol (number average molecular weight: 1750), and that the amount of sodium hydroxide was changed from 182 parts to 100 parts, whereby a polyether polyol diglycidyl ether (b16-1) was obtained. The epoxy equivalent of the glycidyl ether was 4060 g/eq.

Production Example 10<Production of Epoxy Diacrylate (B-16)>

Production Example 3 was repeated except that the polyether polyol diglycidyl ether (b7-2) (320 parts) was changed to the polyether polyol diglycidyl ether (b16-1) (2030 parts), that the amount of toluene was changed from 99.7 parts to 600 parts, and that the amount of acrylic acid was changed from 25.8 parts to 72 parts, whereby an epoxy diacrylate (B-16) having a hydroxy group in the molecule was obtained.

Production Example 11<Production of Polyether Polyol Diglycidyl Ether (b17-1)>

Production Example 2 was repeated except that the polyether polyol (b7-1) (1540 parts) was changed to "NEWPOL PE-108" (4000 parts), i.e., an adduct (number average molecular weight: 16000) of EO with polypropylene glycol (number average molecular weight: 3250) and that the amount of sodium hydroxide was changed from 182 parts to 50 parts, whereby a polyether polyol diglycidyl ether (b17-1) was obtained. The epoxy equivalent of the glycidyl ether was 16000 g/eq.

Production Example 12<Production of Epoxy Diacrylate (B-17)>

Production Example 3 was repeated except that the polyether polyol diglycidyl ether (b7-2) (320 parts) was changed to the polyether polyol diglycidyl ether (b17-1) (4000 parts), that the amount of toluene was changed from 99.7 parts to 600 parts, and that the amount of acrylic acid was changed from 25.8 parts to 18 parts, whereby an epoxy diacrylate (B-17) was obtained.

Production Example 13<Production of Adduct of 40 Mol of EO with Bisphenol A (d2-1)>

A pressure-resistant reaction vessel equipped with a stirrer, a heating and cooling device, and a dropping funnel was charged with an adduct of 4 mol of EO with bisphenol A "NEWPOL BPE-40" available from Sanyo Chemical Industries, Ltd. (404 parts (1 mol part)) and potassium hydroxide (2 parts). After purging with nitrogen, the pressure was adjusted to −0.08 MPa. The temperature was raised to 130° C., and EO (1584 parts (36 mol parts)) was added dropwise over 6 hours while the pressure was adjusted to 0.5 MPaG or lower. Subsequently, the resulting product was aged at 130° C. for 3 hours. Then, after cooling to 100° C., the reaction vessel was charged with an adsorption treatment agent "KYOWAAD 600" available from Kyowa Chemical Industry Co., Ltd. (30 parts). After stirring at 100° C. for 1 hour, the adsorption treatment agent was filtered, whereby an adduct of 40 mol of EO with bisphenol A (d2-1) was obtained.

Production Example 14<Production of Polyester Resin (D-1)>

An adduct of 2 mol of EO with bisphenol A "NEWPOL BPE-20" available from Sanyo Chemical Industries, Ltd. (1264 parts (4 mol parts), terephthalic acid (830 parts (5 mol parts)), and tetra-isopropoxy titanate (2 parts) were reacted in a glass reaction vessel at 170° C. for 15 hours with a pressure reduced to 0.001 MPa while water was distilled off. To the glass reaction vessel was further added the adduct of 40 mol of EO with bisphenol A (d2-1) produced in Production Example 4 (1928 parts (0.97 mol parts)) for reaction at 180° C. for 10 hours with a pressure reduced to −0.1 MPa while water was distilled off, whereby a polyester resin (D-1) (3800 parts) was obtained. The polyester resin (D-1) had a number average molecular weight of 4100 as determined by the above method and a viscosity at 100° C. of 4.5 Pa·s.

Production Example 15<Surfactant (E-2)>

A reaction vessel equipped with a stirrer and a thermostat was charged with an adduct (number average molecular weight: 8000) of EO with polypropylene glycol (number average molecular weight: 1750) "NEWPOL PE-68" available from Sanyo Chemical Industries, Ltd. (992 parts by weight), followed by nitrogen purging. The temperature was raised to 80° C. in a dried nitrogen atmosphere, and toluene diisocyanate (hereinafter abbreviated to "TDI") "CORONATE T-80" available from Nippon Polyurethane Industry Co., Ltd. (8 parts by weight) was added, followed by aging at 80° C. for 5 hours, whereby a nonionic surfactant (E-2) was obtained.

Production Example 16<Epoxy Resin Modified with Acrylic Group (A'-2)>

A bisphenol F epoxy resin "jER 807" available from Mitsubishi Chemical Corporation (330 parts (1 mol part), acrylic acid (72 parts (1 mol part)), and triethanolamine (0.4 parts) were reacted in a glass reaction vessel at 110° C. for 5 hours, whereby an epoxy resin having one end modified with an acrylic group (A'-2) (412 parts) was obtained.

Examples 1 to 29 and Comparative Examples 1 to 8

The raw materials, other than water, in amounts (parts) described in Tables 1 to 3 were uniformly dissolved for 30 minutes in a universal mixer (a universal mixer and stirrer available from San-ei Manufacturing Co., Ltd.) with the temperature controlled to 60° C. Subsequently, water was dropped thereto over 6 hours, whereby fiber sizing agent compositions (C-1) to (C-29) each having an aqueous dispersion concentration of 40 wt % according to Examples of the present invention, and fiber sizing agent compositions (C'-1) to (C'-8) according to Comparative Examples were obtained (250 parts, each).

TABLE 1

| | | Examples | | | | | | | | | | | | | | |
|---|---|---|---|---|---|---|---|---|---|---|---|---|---|---|---|---|
| | | 1<br>C-1 | 2<br>C-2 | 3<br>C-3 | 4<br>C-4 | 5<br>C-5 | 6<br>C-6 | 7<br>C-7 | 8<br>C-8 | 9<br>C-9 | 10<br>C-10 | 11<br>C-11 | 12<br>C-12 | 13<br>C-13 | 14<br>C-14 | 15<br>C-15 |
| Amounts of raw materials (parts by weight) Fiber sizing agent composition (C) | Epoxy resin (A) (A-1) | 25 | — | — | 25 | — | — | 30 | 25 | 25 | 25 | — | 25 | — | — | 25 |
| | (A-2) | — | 25 | 25 | — | 25 | 25 | — | — | — | — | 25 | — | 5 | 5 | — |
| | (A-3) | — | — | — | — | — | — | — | — | — | — | — | — | — | — | — |
| | (A-4) | — | — | — | — | — | — | — | — | — | — | — | — | — | — | — |
| | (A'-1) | — | — | — | — | — | — | — | — | — | — | — | — | — | — | — |
| | (A'-2) | — | — | — | — | — | — | — | — | — | — | — | — | — | — | — |
| | (Meth)acrylate (B) (B-1) | 25 | — | — | — | — | — | — | — | — | — | — | — | — | — | — |
| | (B-2) | — | 25 | — | — | — | — | — | — | — | — | — | — | — | — | — |
| | (B-3) | — | — | 25 | — | — | — | — | — | — | — | — | — | — | — | — |
| | (B-4) | — | — | — | 25 | — | — | — | — | — | — | — | — | — | — | — |
| | (B-5) | — | — | — | — | 25 | — | — | — | — | — | — | — | — | — | — |
| | (B-6) | — | — | — | — | — | 25 | — | — | — | — | — | — | — | — | — |
| | (B-7) | — | — | — | — | — | — | 25 | — | — | — | — | — | — | — | — |
| | (B-8) | — | — | — | — | — | — | — | 25 | — | — | — | — | — | — | — |
| | (B-9) | — | — | — | — | — | — | — | — | 25 | — | — | — | — | — | — |
| | (B-10) | — | — | — | — | — | — | — | — | — | 25 | — | — | — | — | — |
| | (B-11) | — | — | — | — | — | — | — | — | — | — | 25 | — | — | — | — |
| | (B-12) | — | — | — | — | — | — | — | — | — | — | — | 25 | — | — | — |
| | (B-13) | — | — | — | — | — | — | — | — | — | — | — | — | 45 | — | — |
| | (B-14) | — | — | — | — | — | — | — | — | — | — | — | — | — | 45 | — |
| | (B-15) | — | — | — | — | — | — | — | — | — | — | — | — | — | — | 25 |
| | (B-16) | — | — | — | — | — | — | — | — | — | — | — | — | — | — | — |
| | (B-17) | — | — | — | — | — | — | — | — | — | — | — | — | — | — | — |
| | (B-18) | — | — | — | — | — | — | — | — | — | — | — | — | — | — | — |
| | (B-19) | — | — | — | — | — | — | — | — | — | — | — | — | — | — | — |
| | (B-20) | — | — | — | — | — | — | — | — | — | — | — | — | — | — | — |
| | (B-21) | — | — | — | — | — | — | — | — | — | — | — | — | — | — | — |
| | Polyester resin (D) (D-1) | 35 | 35 | 35 | 35 | 35 | 35 | 35 | 35 | 35 | 35 | 35 | 35 | 30 | 35 | 35 |
| | Surfactant (E) (E-1) | 15 | 15 | 15 | 15 | 15 | 15 | 15 | 15 | 15 | 15 | 15 | 15 | 15 | 15 | 15 |
| | Water | 150 | 150 | 150 | 150 | 150 | 150 | 150 | 150 | 150 | 150 | 150 | 150 | 150 | 150 | 150 |
| | Weight ratio (A)/(B) | 50/50 | 50/50 | 50/50 | 50/50 | 50/50 | 50/50 | 60/40 | 50/50 | 50/50 | 50/50 | 50/50 | 50/50 | 10/90 | 10/90 | 50/50 |
| Evaluation of properties | Sizing properties (cm) | 16 | 15 | 18 | 19 | 15 | 18 | 17 | 18 | 19 | 16 | 15 | 15 | 16 | 17 | 20 |
| | Fluff (mg/m) | 0.03 | 0.02 | 0.04 | 0.03 | 0.03 | 0.04 | 0.03 | 0.03 | 0.04 | 0.05 | 0.05 | 0.03 | 0.01 | 0.01 | 0.04 |
| | Adhesion with vinyl ester resin (Mpa) | 45 | 48 | 50 | 47 | 48 | 52 | 45 | 46 | 50 | 44 | 43 | 44 | 44 | 44 | 46 |

TABLE 2

| | | Examples | | | | | | | | | | Comparative Examples | | | | |
|---|---|---|---|---|---|---|---|---|---|---|---|---|---|---|---|---|
| | | 16<br>C-16 | 17<br>C-17 | 18<br>C-18 | 19<br>C-19 | 20<br>C-20 | 21<br>C-21 | 22<br>C-22 | 23<br>C-23 | 24<br>C-24 | 25<br>C-25 | 1<br>C'-1 | 2<br>C'-2 | 3<br>C'-3 | 4<br>C'-4 | 5<br>C'-5 |
| Fiber sizing agent composition (C) | | | | | | | | | | | | | | | | |
| Amounts of raw materials (parts by weight) Epoxy resin (A) | (A-1) | — | — | 25 | 5 | 10 | 45 | 40 | — | — | — | — | — | — | — | — |
| | (A-2) | 5 | — | — | — | — | — | — | — | — | — | — | — | 50 | — | — |
| | (A-3) | — | 5 | — | — | — | — | — | — | — | — | — | 25 | — | — | — |
| | (A-4) | — | — | — | — | — | — | — | 35 | 35 | 35 | — | — | — | — | — |
| | (A'-1) | — | — | — | — | — | — | — | — | — | — | — | — | — | 25 | — |
| | (A'-2) | — | — | — | — | — | — | — | — | — | — | — | — | — | 25 | 50 |
| (Meth)acrylate (B) | (B-1) | — | — | — | — | — | — | — | — | — | — | — | 25 | — | — | — |
| | (B-2) | — | — | — | — | — | — | — | — | — | — | 50 | — | — | — | — |
| | (B-3) | — | — | — | — | — | — | — | — | — | — | — | — | — | — | — |
| | (B-4) | — | — | — | — | — | — | — | — | — | — | — | — | — | — | — |
| | (B-5) | — | — | — | — | 40 | — | 10 | — | — | — | — | — | — | — | — |
| | (B-6) | — | — | — | 45 | — | 5 | — | — | — | — | — | — | — | — | — |
| | (B-7) | — | — | — | — | — | — | — | — | — | — | — | — | — | — | — |
| | (B-8) | — | — | — | — | — | — | — | — | — | — | — | — | — | — | — |
| | (B-9) | — | — | — | — | — | — | — | — | — | — | — | — | — | — | — |
| | (B-10) | — | — | — | — | — | — | — | — | — | — | — | — | — | — | — |
| | (B-11) | — | — | — | — | — | — | — | — | — | — | — | — | — | — | — |
| | (B-12) | — | — | — | — | — | — | — | — | — | — | — | — | — | — | — |
| | (B-13) | — | — | — | — | — | — | — | — | — | — | — | — | — | — | — |
| | (B-14) | — | — | — | — | — | — | — | — | — | — | — | — | — | — | — |
| | (B-15) | — | — | — | — | — | — | — | — | — | — | — | — | — | — | — |
| | (B-16) | 45 | — | — | — | — | — | — | — | — | — | — | — | — | — | — |
| | (B-17) | — | 45 | — | — | — | — | — | — | — | — | — | — | — | — | — |
| | (B-18) | — | — | 25 | — | — | — | — | — | — | — | — | — | — | — | — |
| | (B-19) | — | — | — | — | — | — | — | 20 | — | — | — | — | — | — | — |
| | (B-20) | — | — | — | — | — | — | — | — | 20 | — | — | — | — | — | — |
| | (B-21) | — | — | — | — | — | — | — | — | — | 20 | — | — | — | — | — |
| Polyester resin (D) | (D-1) | 35 | 35 | 35 | 35 | 35 | 35 | 35 | 35 | 35 | 35 | 35 | 35 | 35 | 35 | 35 |
| Surfactant (E) | (E-1) | 15 | 15 | 15 | 15 | 15 | 15 | 15 | 10 | 10 | 10 | 15 | 15 | 15 | 15 | 15 |
| Water | | 150 | 150 | 150 | 150 | 150 | 150 | 150 | 150 | 150 | 150 | 150 | 150 | 150 | 150 | 150 |
| Weight ratio (A)/(B) | | 10/90 | 10/90 | 50/50 | 10/90 | 20/80 | 90/10 | 80/20 | 64/36 | 64/36 | 64/36 | — | — | — | — | — |
| Evaluation of properties Sizing properties (cm) | | 19 | 18 | 16 | 15 | 17 | 22 | 21 | 20 | 19 | 19 | 7 | 6 | 11 | 6 | 6 |
| Fluff (mg/m) | | 0.01 | 0.01 | 0.02 | 0.03 | 0.02 | 0.04 | 0.04 | 0.03 | 0.03 | 0.02 | 0.32 | 0.03 | 0.08 | 0.05 | 0.22 |
| Adhesion with vinyl ester resin (Mpa) | | 45 | 44 | 43 | 43 | 44 | 43 | 44 | 51 | 49 | 45 | 32 | 35 | 30 | 40 | 40 |

TABLE 3

| Fiber sizing agent composition (C) | | | Examples 26 C-26 | Examples 27 C-27 | Examples 28 C-28 | Examples 29 C-29 | Comparative Examples 6 C'-6 | Comparative Examples 7 C'-7 | Comparative Examples 8 C'-8 |
|---|---|---|---|---|---|---|---|---|---|
| Amounts of raw materials (parts by weight) | Epoxy resin (A) | (A-1) | — | — | — | — | — | — | — |
| | | (A-2) | — | — | — | — | 85 | — | — |
| | | (A-3) | — | — | — | — | — | — | — |
| | | (A-4) | — | — | — | — | — | — | — |
| | | (A-5) | 50 | 50 | 35 | 35 | — | — | — |
| | | (A'-1) | — | — | — | — | — | — | — |
| | | (A'-2) | — | — | — | — | — | 35 | 85 |
| | (Meth)acrylate (B) | (B-1) | — | — | — | — | — | 50 | — |
| | | (B-2) | — | — | — | — | — | — | — |
| | | (B-3) | — | — | — | — | — | — | — |
| | | (B-4) | — | — | — | — | — | — | — |
| | | (B-5) | — | — | — | — | — | — | — |
| | | (B-6) | — | — | — | — | — | — | — |
| | | (B-7) | — | — | — | — | — | — | — |
| | | (B-8) | — | — | — | — | — | — | — |
| | | (B-9) | — | — | — | — | — | — | — |
| | | (B-10) | 35 | — | 50 | — | — | — | — |
| | | (B-11) | — | — | — | — | — | — | — |
| | | (B-12) | — | — | — | — | — | — | — |
| | | (B-13) | — | — | — | — | — | — | — |
| | | (B-14) | — | — | — | — | — | — | — |
| | | (B-15) | — | — | — | — | — | — | — |
| | | (B-16) | — | — | — | — | — | — | — |
| | | (B-17) | — | — | — | — | — | — | — |
| | | (B-18) | — | — | — | — | — | — | — |
| | | (B-19) | — | — | — | — | — | — | — |
| | | (B-20) | — | — | — | — | — | — | — |
| | | (B-21) | — | — | — | — | — | — | — |
| | | (B-22) | — | 35 | — | 50 | — | — | — |
| | Polyester resin (D) | (D-1) | — | — | — | — | — | — | — |
| | Surfactant (E) | (E-1) | — | — | — | — | — | — | — |
| | | (E-2) | 15 | 15 | 15 | 15 | 15 | 15 | 15 |
| | Water | | 150 | 150 | 150 | 150 | 150 | 150 | 150 |
| | Weight ratio (A)/(B) | | 41/59 | 41/59 | 59/41 | 59/41 | — | — | — |
| Evaluation of properties | Sizing properties (cm) | | 30 | 28 | 24 | 23 | 10 | 5 | 6 |
| | Fluff (mg/m) | | 0.04 | 0.03 | 0.02 | 0.01 | 0.13 | 0.07 | 0.32 |
| | Adhesion to polyetherimide resin (MPa) | | 47 | 45 | 44 | 43 | 25 | 28 | 35 |
| | Voids in molded article | | Absent | Absent | Absent | Absent | Present | Present | Present |

The chemical compositions of the raw materials indicated by the symbols shown in Tables 1 to 3 are as follows.

(A-1): Bisphenol A epoxy resin (product name "jER 1001" available from Mitsubishi Chemical Corporation; epoxy equivalent: 475 (g/eq))

(A-2): Bisphenol A epoxy resin (product name "jER 828" available from Mitsubishi Chemical Corporation; epoxy equivalent: 135 (g/eq)]

(A-3): Phenol novolac epoxy resin (product name "jER 152" available from Mitsubishi Chemical Corporation; epoxy equivalent: 175 (g/eq))

(A-4): Bisphenol A epoxy resin (product name "jER 1002" available from Mitsubishi Chemical Corporation; epoxy equivalent: 650 (g/eq))

(A-5): Bisphenol A epoxy resin (product name "jER 1004" available from Mitsubishi Chemical Corporation; epoxy equivalent: 950 (g/eq))

(A'-1): Polyethyleneglycol diglycidyl ether (product name "Epolite 400E" available from Kyoeisha Chemical Co., Ltd., without an aromatic ring)

(A'-2): Epoxy resin having one end modified with an acrylic group (half ester), i.e., a product obtained in Production Example 16 by reaction of bisphenol F epoxy resin with acrylic acid (B-1): Polyoxypropylene glycol diacrylate (product name "APG-400" available from Shin-Nakamura Chemical Co., Ltd.; (meth)acrylic equivalent: 268 g/eq)

(B-2): Polyoxypropylene glycol (terminated with epoxy acrylate) (product name "Epoxyester 200PA" available from Kyoeisha Chemical Co., Ltd.; diacrylate having two hydroxy groups; (meth)acrylic equivalent: 224 g/eq; hydroxy value: 250 mgKOH/g)

(B-3): Polyoxyethylene glycol diacrylate (product name "Light Acrylate 9EG-A" available from Kyoeisha Chemical Co., Ltd.; (meth)acrylic equivalent: 254 g/eq)

(B-4): Polyoxyethylene glycol diacrylate (product name "NK Ester A-1000" available from Shin-Nakamura Chemical Co., Ltd.; (meth)acrylic equivalent: 554 g/eq)

(B-5): Diacrylate of an adduct of ethylene oxide with bisphenol A (product name "Light Acrylate BP-4EAL" available from Kyoeisha Chemical Co., Ltd.; (meth)acrylic equivalent: 256 g/eq)

(B-6): Diacrylate of an adduct of propylene oxide with bisphenol A (product name "Light Acrylate BP-4PA" available from Kyoeisha Chemical Co., Ltd.; (meth)acrylic equivalent: 284 g/eq)

(B-7): Epoxy diacrylate obtained in Production Example 3; (meth)acrylic equivalent: 944 g/eq; hydroxy value: 59 mgKOH/g)

(B-8): Polytetramethylene glycol diacrylate (product name "NK Ester A-PTMG-65" available from Shin-Nakamura Chemical Co., Ltd.; (meth)acrylic equivalent: 379 g/eq)

(B-9): Diacrylate of an adduct of ethylene oxide with bisphenol A (product name "NK Ester A-BPE-30" available from Shin-Nakamura Chemical Co., Ltd.; (meth)acrylic equivalent: 828 g/eq)

(B-10): Adduct of 2 mol of acrylic acid with bisphenol A diglycidyl ether (product name "Epoxyester 3000A" available from Kyoeisha Chemical Co., Ltd.; (meth)acrylic equivalent: 242 g/eq; hydroxy value: 232 mgKOH/g)

(B-11): 1,6-Hexanediol diacrylate (product name "Light Acrylate 1.6HX-A" available from Kyoeisha Chemical Co., Ltd.; (meth)acrylic equivalent: 113 g/eq)

(B-12): Polyether polyol diacrylate obtained in Production Example 4; (meth)acrylic equivalent: 1804 g/eq)

(B-13): Polyether polyol diacrylate obtained in Production Example 5; (meth)acrylic equivalent: 4054 g/eq)

(B-14): Polyether polyol diacrylate obtained in Production Example 6; (meth)acrylic equivalent: 8054 g/eq)

(B-15): Epoxy diacrylate obtained in Production Example 8; (meth)acrylic equivalent: 1880 g/eq; hydroxy value: 30 mgKOH/g)

(B-16): Epoxy diacrylate obtained in Production Example 10; (meth)acrylic equivalent: 4130 g/eq; hydroxy value: 14 mgKOH/g)

(B-17): Epoxy diacrylate obtained in Production Example 12; (meth)acrylic equivalent: 8130 g/eq; hydroxy value: 7 mgKOH/g)

(B-18): Triacrylate of an adduct of ethylene oxide with trimethylolpropane (product name "Light Acrylate TMP-6EO-3A" available from Kyoeisha Chemical Co., Ltd.; (meth)acrylic equivalent: 169 g/eq)

(B-19): Diacrylate of an adduct of ethylene oxide with bisphenol A (product name "Light Acrylate BP-10EA" available from Kyoeisha Chemical Co., Ltd.; (meth)acrylic equivalent: 388 g/eq)

(B-20): Diacrylate of polypropylene glycol (product name "NK Ester APG-700" available from Shin-Nakamura Chemical Co., Ltd.; (meth)acrylic equivalent: 404 g/eq)

(B-21): Diacrylate of an adduct of propylene oxide/ethylene oxide with bisphenol A (product name "NK Ester A-B1206PE" available from Shin-Nakamura Chemical Co., Ltd., (meth)acrylic equivalent: 648 g/eq)

(B-22): Bisphenol A diglycidyl ether methacrylate (product name "Epoxyester 3000A" available from Kyoeisha Chemical Co., Ltd.; (meth)acrylic equivalent: 242 g/eq; hydroxy value: 232 mgKOH/g)

(D-1): Polyester resin obtained in Production Example 14

(E-1): Emulsifier containing, as the surfactant (E), an adduct of propylene oxide and ethylene oxide with styrenated phenol that is a nonionic surfactant (product name "Soprophor 796/P" available from Solvay Nicca, Ltd.)

(E-2): Nonionic surfactant obtained in Production Example 15

Using the fiber sizing agent compositions of Examples and Comparative Examples, the sizing properties of carbon fiber bundles, fulling, and adhesion to the matrix resin (vinyl ester resin or polyetherimide) were evaluated by the following evaluation methods. Examples 26 to 29 and Comparative Examples 6 to 8 were also checked for the presence or absence of voids in molded articles of composite materials containing these fiber sizing agent compositions. Tables 1 to 3 show the results.

<Evaluation of Sizing Properties>

(1) Untreated carbon fibers (fineness: 800 tex; number of filaments: 12000) were immersed in an aqueous solution obtained by diluting the fiber sizing agent composition with water to a solids concentration of 1.5 wt % in order to impregnate the fibers with the sizing agent, followed by hot air drying at 180° C. for 3 minutes, whereby a carbon fiber bundle was produced.

(2) The sizing properties of the carbon fiber bundle were evaluated in accordance with JIS L 1096-1999 8.19.1, Method A (45° cantilever method).

A higher value (cm) indicates better sizing properties.

The carbon fiber bundle obtained under such treatment conditions was evaluated using a cantilever. Generally, the value of sizing properties is preferably 13 cm or more.

<Evaluation of Fluffing>

(1) A carbon fiber bundle was produced by the same method as described above.

(2) Five chrome-plated stainless steel rods each having a diameter of 2 mm were arranged in a zigzag manner with a spacing of 15 mm therebetween so as to allow the carbon fiber bundle to pass the surfaces of these stainless steel rods in contact with each of them with a contact angle of 120°.

The carbon fiber bundle was set in a zigzag manner between these stainless steel rods, and a tension of 1 kgf was applied. The carbon fiber was sandwiched between two 10 cm×10 cm sheets of urethane foam under a load of 1 kgf at a position immediately before a wind-up roll so as to be scratched at a speed of 1 m/min for 5 minutes.

(3) The weight of fluff attached to the sponge during scratching was measured, and the weight (mg/m) of fluff per fiber unit length was calculated.

A lower weight of the fluff per unit length indicates less occurrence of fluffing.

Generally, the amount of fluff of the carbon fiber bundle obtained under the above treatment conditions is preferably 0.05 mg/m or less.

<Evaluation of Adhesion (Vinyl Ester Resin)>

The adhesion was evaluated by the microdroplet method.

(1) A carbon fiber filament was taken out from the carbon fiber bundle obtained by the above method, and was set in a sample holder.

(2) A microdroplet of a matrix resin containing vinyl ester resin (25 parts by weight) ("Ripoxy R-804" available from Showa Denko K.K. (100 parts by weight) and a curing agent "PERMEK N" available from NOF Corporation (25 parts by weight)) was formed on the carbon fiber filament, followed by heating at 25° C. for 24 hours and 120° C. for 5 hours for curing, whereby a sample for adhesion measurement was obtained.

(3) The sample for measurement was set in a device for evaluation of composite interface properties "HM410" available from Tohei Sangyo Co., Ltd., and the maximum pull-out load F when pulling out the microdroplet from the carbon fiber filament was measured.

(4) Interfacial shear strength i was calculated by the following formula:

Interfacial shear strength $\tau$ (unit: MPa)=F/ndL where F is the maximum pull-out load (N), d is the diameter (μm) of a carbon fiber filament, and L is the particle size (μm) of the microdroplet in the pulling-out direction.

A higher interfacial shear strength i indicates better adhesion, and is preferably 43 MPa or more, more preferably 45 MPa or more.

<Evaluation of Adhesion (Polyetherimide Resin)>

The adhesion was evaluated by the fragmentation method.

(1) A carbon fiber filament was taken out from the carbon fiber bundle obtained by the above method, sandwiched vertically between stacked polyetherimide resin films "SUPERIO®" E type available from Mitsubishi Plastics, Inc., and pressed with a heat-pressing device, whereby a molded plate with a single carbon fiber thread embedded therein was obtained. A dumbbell-shaped test piece was punched out from this molded plate.

(2) The dumbbell-shaped sample was held at both ends to apply a tensile force in the fiber axial direction (longitudinal direction) so as to cause a strain of 12% at a speed of 2.0 mm/min. Subsequently, the sample was heated to make the inside transparent, and the lengths of fragmented fibers in the sample were observed under a microscope.

(3) Further, the critical fiber length lc was calculated from the average broken fiber length la by the following formula: lc (μm)=(4/3)×la (μm). The strand tensile strength σ and the diameter d of a single carbon fiber thread were measured, and the interfacial shear strength (IFSS) that is an indicator of the adhesion strength at the interface between the carbon fiber and resin was calculated by the following formula to determine the adhesion (MPa) between the carbon fiber and the polyetherimide resin as shown in the tables. In Examples, the test results are averages (the number of measurements n=5).

$$IFSS(MPa)=\sigma(MPa) \times d(\mu m)/(2 \times lc)(\mu m)$$

In the present invention, the IFSS is preferably 40 MPa or more, more preferably 43 MPa or more.

<Checking for Voids>

A molded article of a composite material made of a thermoplastic resin was produced by the following procedure, and was checked for the presence or absence of voids.

(1) Carbon fiber bundles obtained by the above method were set, and carbon fiber sheets were produced.

(2) Subsequently, five resin films "SUPERIO®" E type available from Mitsubishi Plastics, Inc. and the carbon fiber sheets were alternatively stacked together, whereby a multilayer film including four carbon fiber sheets was produced.

(3) The multilayer film was placed in a hydraulic vacuum forming machine heated to 370° C., and was pre-heated in vacuum for 4 minutes. After pressing at 10 MPa for 4 minutes, the multilayer film was cooled at 30° C. for 2 minutes and released, whereby a molded article of a composite material made of an intended thermoplastic resin was obtained.

(4) The resulting molded article of the composite material made of the thermoplastic resin was cut with a cutter to visually check for the presence or absence of voids.

The results in Tables 1 to 3 show that use of the fiber sizing agent compositions of Examples 1 to 29 was capable of providing fiber bundles with high sizing properties and reduced fluffing, and was also capable of improving the adhesion between the fibers and the matrix resin. Further, the results of Examples 26 to 29 show that these fiber sizing agent compositions are likely to increase the strength of composite materials containing these fiber sizing agent compositions because no voids were generated in molded articles of these composite materials.

In contrast, the results show that use of the fiber sizing agent compositions of Comparative Examples 1, 2, 4, and 5 each not containing the epoxy resin (A) having an aromatic ring resulted in fiber bundles with low sizing properties. In particular, use of the fiber sizing agent composition of Comparative Example 1 containing only the (meth)acrylate (B) resulted in a fiber bundle with a very large amount of fluff, and a composite material with a very low adhesion between the fibers and the matrix resin. Use of the fiber sizing agent composition of Comparative Example 2 containing the epoxy resin (A'-1) not having an aromatic ring and the (meth)acrylate (B) resulted in a fiber bundle with a small amount of fluff but a composite material with low adhesion between the fibers and the matrix resin. Use of the fiber sizing agent compositions of Comparative Examples 4 and 5 each containing the epoxy resin (A'-2) having an aromatic ring and an acryloyl group resulted in composite materials with a slightly high adhesion between the fibers and the matrix resin but fiber bundles with a large amount of fluff. Use of the fiber sizing agent composition of Comparative Example 3 containing only the epoxy resin (A) and not containing the (meth)acrylate (B) resulted in a fiber bundle with slightly high sizing properties but a composite material with a very low adhesion between the fibers and the matrix resin. Use of the fiber sizing agent compositions of Comparative Examples 6 to 8 resulted in fiber bundles with low sizing properties and a large amount of fluff, composite materials with a very low adhesion between the fibers and the matrix resin, and molded articles with voids.

The invention claimed is:

1. A fiber sizing agent composition (C) comprising:
   an epoxy resin (A) having an aromatic ring and not having a (meth) acryloyl group;
   a (meth) acrylate (B), and
   a polyester resin (D) having a bisphenol skeleton and a polyoxyethylene chain, and comprising, as constituent monomers, a C8-C14 aromatic dicarboxylic acid or its anhydride and a diol having a bisphenol skeleton and a polyoxyethylene chain,
   wherein the (meth) acrylate (B) is a (meth) acrylate (B1) not having an oxyalkylene group or a (meth) acrylate (B2) having an oxyalkylene group, and
   when the (meth) acrylate (B1) is a bifunctional (meth) acrylate (B11), the bifunctional (meth) acrylate (B11) is at least one selected from the group consisting of (i) a non-aromatic di- esterified product of a C2-C20 di-to octahydric alcohol and (meth) acrylic acid, and (ii) a di-esterified product of a diglycidyl ether of a dihydric phenol and methacrylic acid; and
   when the (meth) acrylate (B2) is a bifunctional (meth) acrylate (B21), the bifunctional (meth) acrylate (B21) is at least one selected from the group consisting of (i) a di-esterified product of an adduct of AO with a di-to octahydric alcohol and (meth) acrylic acid, (ii) a di-esterified product of an adduct of AO with a dihydric phenol and (meth) acrylic acid, and (iii) an epoxy acrylate that is a reaction product of a diglycidyl ether of an adduct of AO with a dihydric alcohol or a dihydric phenol and acrylic acid, and
   wherein a weight ratio (epoxy resin (A)/(meth) acrylate (B)) of the epoxy resin (A) having an aromatic ring and not having a (meth) acryloyl group to the (meth) acrylate (B) is 10/90 to 90/10.

2. The fiber sizing agent composition (C) according to claim 1,
   wherein the (meth) acrylate (B) is a (meth) acrylate having two or more (meth) acryloyl groups.

3. A fiber bundle comprising:
   at least one type of fiber selected from the group consisting of a carbon fiber, a glass fiber, an aramid fiber, a ceramic fiber, a metal fiber, a mineral fiber, and a slag fiber, wherein the at least one type of fiber is treated with the fiber sizing agent composition (C) according to claim 1.

4. A fiber bundle comprising:
   at least one type of fiber selected from the group consisting of a carbon fiber, a glass fiber, an aramid fiber, a ceramic fiber, a metal fiber, a mineral fiber, and a slag fiber;
   an epoxy resin (A) having an aromatic ring and not having a (meth) acryloyl group and/or a reaction product of the epoxy resin (A) having an aromatic ring and not having a (meth) acryloyl group;

a (meth) acrylate (B) and/or a reaction product of the (meth) acrylate (B), and a polyester resin (D) having a bisphenol skeleton and a polyoxyethylene chain, and comprising, as constituent monomers, a C8-C14 aromatic dicarboxylic acid or its anhydride and a diol having a bisphenol skeleton and a polyoxyethylene chain, wherein the (meth) acrylate (B) is a (meth) acrylate (B1) not having an oxyalkylene group or a (meth) acrylate (B2) having an oxyalkylene group, and when the (meth) acrylate (B1) is a bifunctional (meth) acrylate (B11), the bifunctional (meth) acrylate (B11) is at least one selected from the group consisting of (i) a non-aromatic di-esterified product of a C2-C20 di-to octahydric alcohol and (meth) acrylic acid, and (ii) a di-esterified product of a diglycidyl ether of a dihydric phenol and methacrylic acid; and when the (meth) acrylate (B2) is a bifunctional (meth) acrylate (B21), the bifunctional (meth) acrylate (B21) is at least one selected from the group consisting of (i) a di-esterified product of an adduct of AO with a di- to octahydric alcohol and (meth) acrylic acid, (ii) a di-esterified product of an adduct of AO with a dihydric phenol and (meth) acrylic acid, and (iii) an epoxy acrylate that is a reaction product of a diglycidyl ether of an adduct of AO with a dihydric alcohol or a dihydric phenol and acrylic acid, and wherein a weight ratio (epoxy resin (A) and reaction product of the epoxy resin (A)/(meth) acrylate (B) and reaction product of the (meth) acrylate (B)) of the epoxy resin (A) and the reaction product of the epoxy resin (A) to the (meth) acrylate (B) and the reaction product of the (meth) acrylate (B) in the fiber bundle is 10/90 to 90/10.

5. A fiber product comprising:
the fiber bundle according to claim 3.

6. A composite material comprising:
at least one selected from the group consisting of (1) the fiber bundle according to claim 3, and (2) a fiber product comprising the fiber bundle according to claim 3; and
a matrix resin.

7. The fiber sizing agent composition (C) according to claim 1,
wherein the (meth)acrylate (B) is the (meth)acrylate (B1) not having an oxyalkylene group.

8. The fiber sizing agent composition (C) according to claim 1,
wherein the (meth)acrylate (B) is the (meth)acrylate (B1) not having an oxyalkylene group, and the (meth)acrylate (B1) is the bifunctional (meth)acrylate (B11), wherein the bifunctional (meth)acrylate (B11) is the non-aromatic di-esterified product of a C2-C20 di-to octahydric alcohol and (meth) acrylic acid.

9. The fiber sizing agent composition (C) according to claim 1,
wherein the (meth)acrylate (B) is the (meth)acrylate (B1) not having the oxyalkylene group, and
the (meth)acrylate (B1) is the bifunctional (meth)acrylate (B11), wherein the bifunctional (meth)acrylate (B11) is the di-esterified product of a diglycidyl ether of a dihydric phenol and methacrylic acid.

10. The fiber sizing agent composition (C) according to claim 1,
wherein the (meth) acrylate (B) is the (meth)acrylate (B2) having an oxyalkylene group.

11. The fiber sizing agent composition (C) according to claim 1,
wherein the (meth)acrylate (B) is the (meth)acrylate (B2) having an oxyalkylene group, and
the (meth)acrylate (B2) is the bifunctional (meth)acrylate (B21), wherein the bifunctional (meth)acrylate (B21) is the di-esterified product of an adduct of AO with a di-to octahydric alcohol and (meth) acrylic acid.

12. The fiber sizing agent composition (C) according to claim 1,
wherein the (meth) acrylate (B) is the (meth)acrylate (B2) having an oxyalkylene group, and
the (meth)acrylate (B2) is the bifunctional (meth)acrylate (B21), wherein the bifunctional (meth)acrylate (B21) is the di-esterified product of an adduct of AO with a dihydric phenol and (meth)acrylic acid.

13. The fiber sizing agent composition (C) according to claim 1,
wherein the (meth)acrylate (B) is the (meth)acrylate (B2) having an oxyalkylene group, and
the (meth)acrylate (B2) is the bifunctional (meth)acrylate (B21), wherein the bifunctional (meth)acrylate (B21) is the epoxy acrylate that is a reaction product of a diglycidyl ether of an adduct of AO with a dihydric alcohol or a dihydric phenol and acrylic acid.

14. A fiber product comprising:
the fiber bundle according to claim 4.

15. A composite material comprising:
at least one selected from the group consisting of (1) the fiber bundle according to claim 6, and (2) a fiber product comprising the fiber bundle according to claim 4; and
a matrix resin.

* * * * *